March 3, 1970 R. K. TELEFSON 3,498,435

CHUTE FOR TRUCK BODY

Filed Nov. 17, 1967

INVENTOR.
ROBERT K. TELLEFSON
BY Carlsen, Carlsen, Sturm & Hicks
ATTORNEYS 3,498,435
CHUTE FOR TRUCK BODY
Robert K. Tellefson, Makoti, N. Dak. 58756
Filed Nov. 17, 1967, Ser. No. 684,011
Int. Cl. B65g *11/12, 11/14*
U.S. Cl. 193—4 3 Claims

ABSTRACT OF THE DISCLOSURE

The disclosure relates to chutes for the transfer of grain, fertilizer and the like from a truck to the grain box of a grain drill, for example, and includes an open channel body which is extendable and which is formed at the upper end with an angularly extending lip. At the lip formation the chute includes means pivotally and slidably mounting the chute on the side wall of a truck. The extendable portion of the channel body has a handle thereon for moving the extendable portion.

SUMMARY OF THE INVENTION

The invention relates broadly to chutes and more particularly to a chute which is carried by the side wall of a truck for transfer of the contents of the truck, such as grain, into the grain box of a grain drill, for example, positioned alongside the truck. It is an object of the invention to provide a chute which is pivotally mounted on the side wall of a truck which allows a storage position flat upon the truck wall and an extended angular slide position from the truck into a grain box adjacent the truck.

It is a further object to provide a chute of the type described above which has an angularly disposed lip portion at the upper end of the chute body on which the pivotal connection is made with the truck wall. It is also an object to provide a chute which is slidably mounted on the wall of the truck body to accommodate different size truck walls and lengths of grain boxes filled with the chute.

These and other more detailed and specific objects will be disclosed in the course of the following specification, reference being had to the accompanying drawing, in which—

Figures 1, 2, 3, 4, 5, 6:
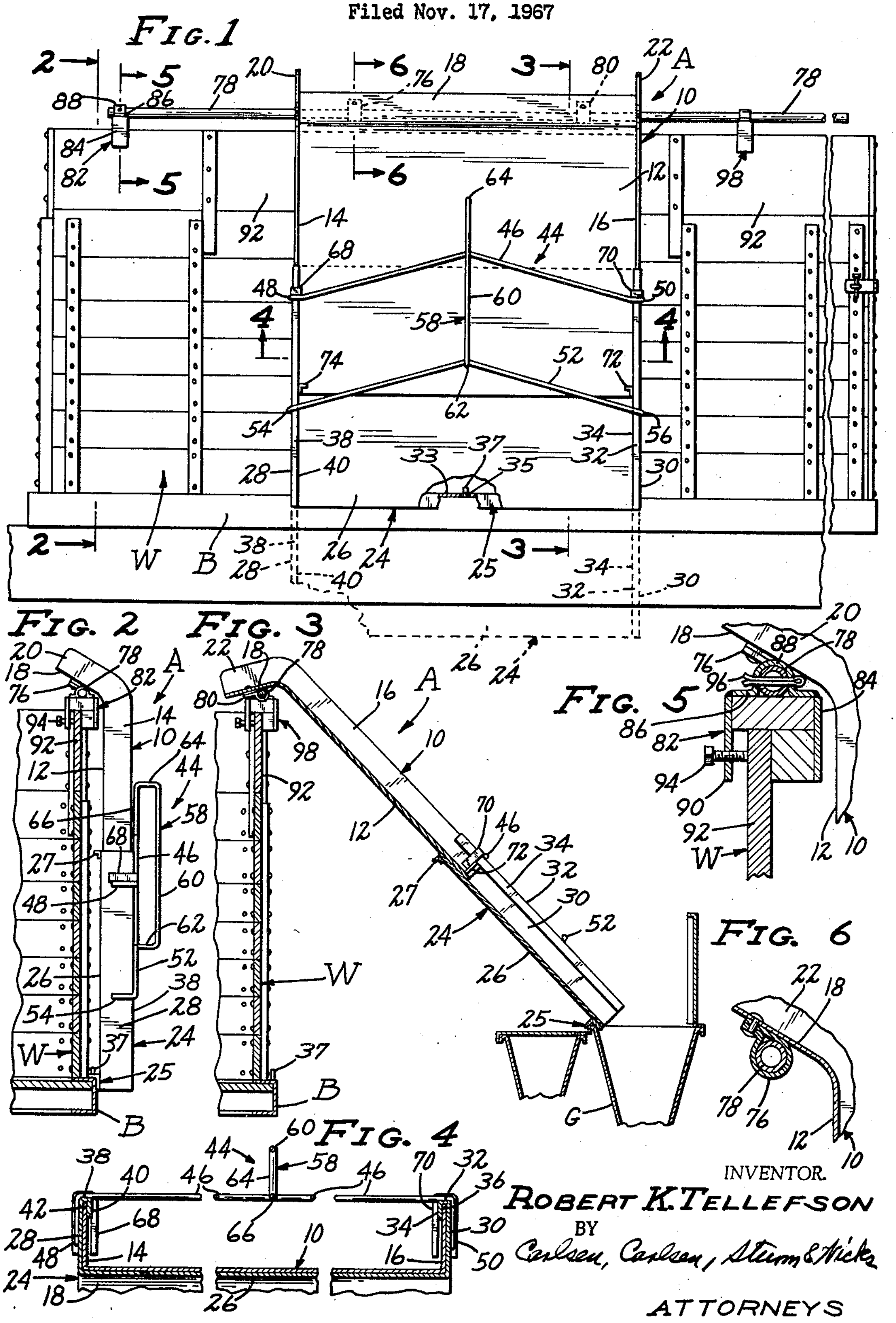
FIG. 1 is a side elevational view of a truck box on which is mounted the chute embodying the invention.
FIG. 2 is a sectional view on the line 2—2 of FIG. 1.
FIG. 3 is a sectional view on the line 3—3 of FIG. 1 but with the chute in extended condition, a portion thereof broken away, and the end of the chute in position on the box of a grain drill.
FIG. 4 is a sectional view on the line 4—4 of FIG. 1 of only the chute, portions thereof being broken away.
FIG. 5 is a sectional view on the line 5—5 of FIG. 1.
FIG. 6 is a sectional view on the line 6—6 of FIG. 1.

Referring to the drawings in detail, the chute A includes the upper chute portion 10 formed of the rectangular flat bottom 12 and the upstanding side walls 14 and 16 formed on the opposite parallel side edges of the bottom 12. The bottom 12 has formed on the upper edge thereof the lip portion 18 angularly disposed to the bottom 12 at approximately 120 degrees. The side walls 14 and 16 terminate in the end portions 20 and 22 which follow the angularly disposed lip portion 18 of the bottom in conformance therewith.

The chute A also includes the lower chute portion 24 formed of the rectangular bottom portion 26 and the upstanding side walls 28 and 30 formed on the opposite parallel side edges of the bottom portion 26. The distance between the walls 28 and 30 is such that the walls 14 and 16 of the upper chute portion are slidable between the same. The upper edge of the side wall 30 is formed with the narrow right angular portion 32 which terminates in the lip 34 depending therefrom at a right angle thereto and spaced from the wall 30 to form an inverted channel 36. The top portion of the side wall 16 slidably fits within the channel 36. The lower end of the bottom 26 has secured thereto the transverse angle brace 25. An upper angle brace 27 is also provided. The horizontal leg 33 of the brace 25 is formed with a hole 35, and a pin 37 is mounted vertically on the upper edge of the longitudinal support B of the wall W. In storing the chute A on the side wall W, the lower chute portion is raised sufficiently to allow the pin 37 to be inserted into the hole 35 of the brace 25 with the leg 33 of the brace 25 resting upon the support B. With this construction the lower chute portion 24 is maintained in a collapsed or unextended position upon the upper chute portion and the entire chute held firmly in a stored position against the truck wall W.

The upper edge of the chute side wall 28 is formed with the narrow right angular portion 38 which terminates in the lip 40 depending therefrom at a right angle thereto and spaced from the wall 28 to form an inverted channel 42. The top portion of the side wall 14 slidably fits within the channel 42, and the bottom 26 is slidably positioned on the bottom 12.

The chute further includes a handle 44 for slidably moving the lower chute portion 24 to an extended position. The handle 44 includes the upper transverse member 46 which has formed on one end the right angular leg 48 which is secured by welding or the like to the side wall 28. The other end of the member 46 is formed with the right angular leg 50 which is secured by welding or the like to the side wall 30. Further included in the handle 44 is the lower transverse member 52 which is identical to member 46 and has formed on one end the right angular leg 54 secured by welding or the like to the side wall 28 in spaced relation to leg 48 of member 46. The other end of member 52 is formed with the right angular leg 56 which is secured by welding or the like to the side wall 30 in spaced relation to leg 50 of member 46. The handle portions 46 and 52 are in parallel relationship and are connected by the central handle portion 58 formed of the main portion 60 which terminates at the lower end at the right angular leg 62 which is welded to the lower transverse member 52 centrally thereof. The main portion 60 of handle portion 58 has formed on the upper end thereof the right angular portion 64 which terminates in the right angular arm 66 underlying the main portion 60, and the end of the arm 66 is welded to the upper transverse member 46 centrally thereof, thereby completing the handle 44.

The numeral 68 designates a shoulder member secured to and carried by the wall 28 of the lower chute portion 24, and the numeral 70 designates a shoulder member secured to and carried by the wall 30 of the chute portion. A stop 72 is secured to the side wall 16 of the upper chute portion 12, and a companion stop 74 is secured to the side wall 14 of the upper chute portion 12 in horizontal alignment with stop 72. The shoulder 68 abuts the stop 74, and the shoulder 70 abuts the stop 72 when the lower chute portion 24 is slidably moved from the retracted full line position of FIG. 1 to the extended broken line position, thereby holding the chute in the extended position. The chute A is also shown in the extended position in FIG. 3 for filling the grain box G positioned adjacent the truck wall W.

The chute A is pivotally and slidably mounted on the truck wall W by means of the following structure. The numeral 76 designates a first bearing secured to the underside of the chute lip 18 and in which the support rod 78 is slidably mounted. A second bearing 80 is provided which is also secured to the underside of the lip 18 spaced from the first bearing 76 and in which the support rod 78 is slidably mounted.

Further provided is the first support block 82 which includes the first leg 84 which terminates in the top portion 86 formed with the semicircular bearing portion 88. Extending from the top 86 and parallel to the first leg 84 is the second leg 90. The support block 82 is secured to the top rail 92 of the truck side wall W by means of the screw 94 threadedly engaged with the leg 90 and urged against the wall W. The rod 78 at one end is secured in the support 82 by means of the cotter pin 96. The other end of the rod 78 is slidably mounted in a second support 98 identical to the first support 82, but the rod 78 is not secured against displacement in the second support, the support 98 adjustably mounted on the rail 92 depending upon the length of the truck side wall.

It will be seen that with the lip 18 the bearings 76 and 78 may be secured thereto whereby the bearings are offset relative to the bottom portions 12 and 26 so that the chute may be stored in a position close to and parallel to the side wall W of a truck. The lip also extends into the truck when the chute is moved into operative position as in FIG. 3.

The chute A is swung into the position flat against the truck wall W for transporting and when the chute is not in use. In using the chute A the same is pivotally swung away from the wall W as illustrated in FIG. 3. The chute is extended by means of handle 44. The transverse angle brace 25 is positioned upon the edge of the grain box G whereby grain may be moved down the chute from the truck to the grain box G. When the box G is filled the lower chute portion 24 is moved upwardly upon the upper chute portion 10 and the chute allowed to pivot to the storage position alongside the truck wall W as illustrated in FIGS. 1 and 2. The full length of a box G may be filled and the full length of the truck body emptied by sliding the chute A along the rod 78 to accommodate the entire length of both the box G and the truck with the lower end of the chute being slidably moved along the top edge of the box G as the box is progressively filled.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. A chute for use with the wall of a truck body for unloading the same comprising:

(a) a chute body,
(b) the upper end of said chute body having a lip portion disposed angularly and downwardly from said chute body and extending transversely thereof,
(c) means for pivotally and slidably mounting said chute body at the upper end thereof on the wall of a truck for extension from the wall, (d) said pivotal means for said chute body including rod means extending along said wall and having a length at least double that of the width of the chute body,
(e) means for mounting said rod means on the wall of a truck, and
(f) a pivotal connector connecting said chute body with said rod means.

2. A chute for use with the wall of a truck body for unloading the same comprising:

(a) a chute body,
(b) the upper end of said chute body having an angularly disposed portion extending transversely thereof,
(c) means for pivotally and slidably mounting said chute body at the upper end thereof on the wall of a truck for extension from the wall,
(d) said chute body including an upper portion and
(e) a lower portion slidably mounted on the upper portion for extension therefrom,
(f) said pivotal means for said chute body including rod means,
(g) means for mounting said rod means on the wall of a truck,
(h) a pivotal connector connecting said chute body with said rod means,
(i) said slidable means for said chute body including said connector slidable on said rod means.

3. A chute for use with the wall of a truck body for unloading the same comprising:

(a) a chute body,
(b) the upper end of said chute body having an angularly disposed portion extending transversely thereof,
(c) means for pivotally and slidably mounting said chute body at the upper end thereof on the wall of a truck for extension from the wall,
(d) said pivotal means for said chute body including rod means,
(e) means for mounting said rod means on the wall of a truck,
(f) a pivotal connector connecting said chute body with said rod means,
(g) said slidable means for said chute body including said connector slidable on said rod means.

References Cited

UNITED STATES PATENTS

| | | | |
|---|---|---|---|
| 1,241,436 | 9/1917 | Peterson | 193—5 |
| 2,542,799 | 2/1951 | Day | 193—5 |
| 3,348,646 | 10/1967 | McCall | 193—5 |

RICHARD E. AEGERTER, Primary Examiner

DOUGLAS D. WATTS, Assistant Examiner